June 7, 1960     M. HEERSCHAP ET AL     2,939,941
ERODING OF HARD CRYSTALLINE CARBON
Filed March 20, 1958     2 Sheets-Sheet 1
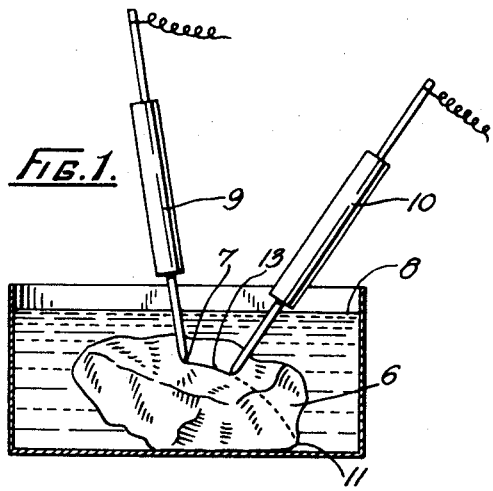
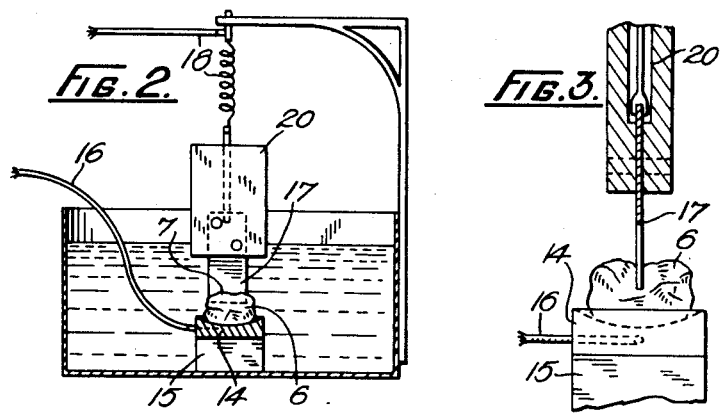
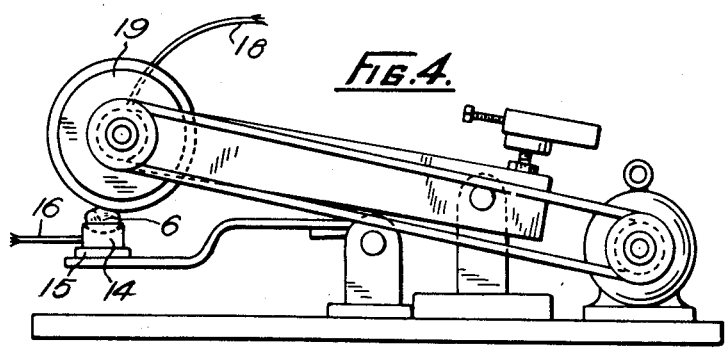
INVENTORS
MATTHYS HEERSCHAP
CHARLIE MAURICE LEVITT
By Irwin S. Thompson
ATTY.

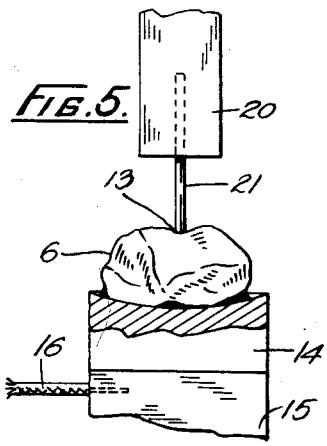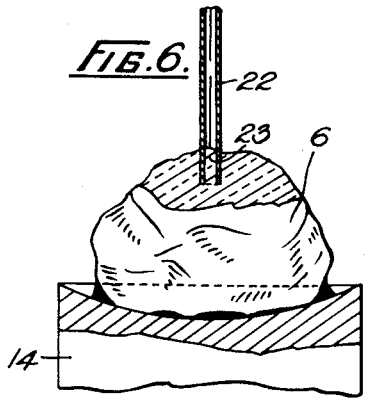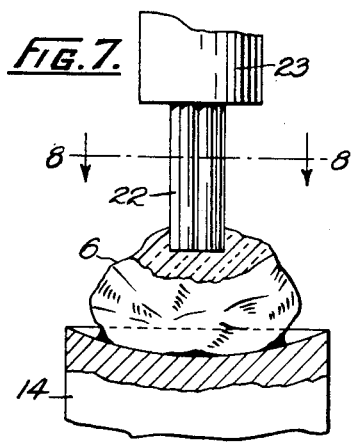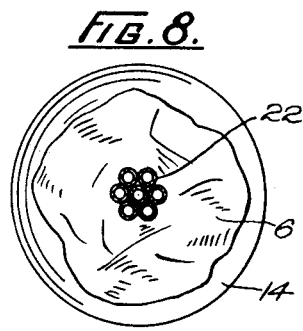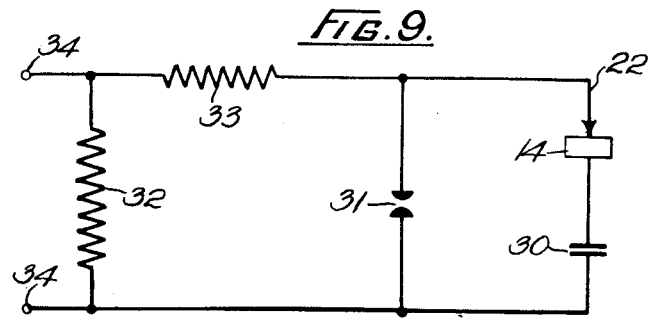

United States Patent Office 2,939,941
Patented June 7, 1960

2,939,941
ERODING OF HARD CRYSTALLINE CARBON

Matthys Heerschap and Charlie M. Levitt, both of Crown Mines, Johannesburg, Union of South Africa Filed Mar. 20, 1958, Ser. No. 723,084

Claims priority, application Union of South Africa Mar. 20, 1957

6 Claims. (Cl. 219—69)

This invention relates to sawing, sectioning, dividing, cutting, drilling and like operations (herein collectively referred to as "eroding") of hard crystalline carbon such as diamond.

The well-known method of sawing a diamond is by means of a thin Phosphor bronze disc mounted on a rotatable spindle at the end of an arm. The periphery of the disc is coated with a suspension of diamond dust or powder in oil. The diamond to be sawn is lowered by supporting means on to the disc while the latter is rotating at a suitable speed. Periodically the coating of diamond powder has to be renewed, and the sawing process takes a considerable period of time, extending to a day or more in a great number of cases.

It is also well known that sawing diamonds by this method can usually only be achieved in certain directions, which are parallel to either a cube or dodecahedron face. The sawing direction is not independent of the direction of the grain of the diamond at the will of the operator.

It has been previously proposed, by means of connecting the insulated metal mounting for the diamond to one secondary terminal of a high-voltage transformer and connecting the disc to the other terminal, to pass an electrical current through the disc while sawing a diamond. The arc created between the periphery of the rotating disc and the mounting affixed to the diamond increases the sawing rate at its commencement but very soon ceases to be effective when a small depth of cut has been made. Without the assistance of mechanical abrasion, no saw cut of any depth whatever can at present be achieved by known electrical methods.

There are similar difficulties in the drilling of holes in diamonds. At present, conventional mechanical methods are used, either alone or in conjunction with electrical methods. In the latter cases, a spark is created between a needle point placed on the diamond surface and a second electrode to form a small cavity, which is then widened and deepened by a rotating or oscillating drill using a diamond powder abrasive suspended in oil in the cavity. A diamond exceeding 1¼ mm. in depth in the direction of the hole being drilled cannot be completely pierced by known electrical methods alone.

It is an object of the invention to provide an electrical method and apparatus for sawing or drilling diamonds to overcome the objections which are inherent in presently known methods.

According to the invention, a method of eroding a body of hard crystalline carbon, consists in superficially graphitising at least part of the body, contacting the graphitised zone with two spaced electrodes submerged in an inert dielectric medium, impressing a voltage between the electrodes which causes sparking between an electrode and the body surface, that electrode being loaded to cause movement in a direction relatively to the body calculated to effect the desired erosion of the body.

The invention is further discussed hereunder with reference to the accompanying drawings, in which Figure 1 is a side view of apparatus for creating a line of graphitisation, Figure 2 is a side view of apparatus for sawing a diamond, Figure 3 is an enlarged end view of part of Figure 2, Figure 4 is a side view of modified apparatus for sawing a diamond, Figure 5 is a view similar to Figure 3 of a drilling operation, Figure 6 is a view similar to Figure 3 of an operation for forming a thin diamond rod, Figure 7 is a sectional elevation of apparatus for forming a number of rods simultaneously, and Figure 8 is a plan view on the line 8—8 of Figure 7, Figure 9 is a circuit diagram suitable for use with the apparatus above illustrated.

The process common to all operations according to the invention is illustrated in Figure 1. In this process a line of graphitisation is drawn across the surface of the diamond between two convenient points.

As shown, the diamond 6 is immersed in a dielectric liquid 8, preferably paraffin. One of the chosen points 7 on the surface of the diamond 6 is contacted by a needle electrode 9. A similar electrode 10 is placed within a suitable distance from the electrode 9. The distance varies with the voltage and the type of dielectric but is usually about ¾ mm. A spark-producing voltage of about 10,000 volts is now impressed across the electrodes 9 and 10. This results in the burning of a line of graphitisation 13 between the points of the electrodes across the surface of the diamond. If the electrode 10 be now moved in steps of ¾ mm. towards the other point, for example at 11, a complete line may be burnt across the surface.

The essence of the invention is that if the line 13 is contacted by two electrodes and one, which is slightly loaded, moves in a direction to erode the diamond, the desired erosion will take place at the points of contact between that electrode and the surface of the diamond.

In practice it has been found that, with the line of graphitisation, it is not easy always to effect efficient electrical contact with such a line unless the non-eroding electrode is in intimate contact with the graphitised area. In the preferred form of the invention, therefore, the whole of the surface of the diamond is graphitised. This is conveniently done by heating the diamond in a non-oxidising oxy-acetylene flame until the graphitising temperature is reached. The flame is then slowly removed while maintaining the diamond in the atmosphere created by the flame to prevent oxidisation of the graphite layer. As the flame is moved away the diamond cools until a temperature below the oxidising temperature is reached. The whole of the surface of the diamond is now graphitised and the resistance across the surface to the passage of an electrical current is of the order of 100 ohms.

A sawing operation has been illustrated in Figures 2 and 3. Here the diamond 6 is mounted on the usual type of holder 14 which is mounted on an insulating base 15. The holder is connected to an electrical lead 16 and is also in electrical contact with the point 11 on the diamond 6.

The held diamond 6 is immersed in paraffin as before. A metallic blade 17 is placed on the point 7 and is loaded by means of a suitable weight 20. The blade 17 is connected to an electrical lead 18. If now the two leads 18 and 16 are connected across a high voltage supply, say 2,000–6,000 volts, the blade erodes the surface of the diamond 6 and, under the influence of the weight 20, sinks into the diamond.

In tests using this apparatus it has been found that a diamond measuring 6.4 mm. in width and 0.6 mm. in depth could be separated into two parts along a cleavage plane in under 15 minutes. Likewise a diamond of 2.5 mm. in depth and of the same width was completely sawn through along a cleavage plane in two and a quarter hours. The results are the more striking if it be borne in mind that a diamond cannot be sawn along a cleavage plane by conventional methods. It should also be noted that the operation is continuous and that no mechanical abrading process is used.

It has been found that in the operation discussed above the cut made in the diamond tends to widen at the top due to spark erosion taking place sideways of the blade. The apparatus shown in Figure 4 largely overcomes this difficulty. In this case a rotary blade 19 is used. The speed of the blade need not be fast, say, of the order of 200 r.p.m. The movement of the blade sweeps paraffin into the cut and largely prevents sideways sparking. The method has the advantage of cutting diamonds with knots and the like which cannot be cut at all by conventional operations.

A drilling operation is illustrated in Figure 5. Here a needle 21 attached to the weight 20 acts as the eroding electrode. The needle point may be flat. Once again the needle need only contact one end of the line of graphitisation 13 leading to the lower electrode 14 for a hole to be drilled through the diamond in a single operation.

In Figure 6 the operation involved is the forming of thin rods of diamond which are suitable for use as gramophone needles or styli. The eroding electrode 22 is a hollow cylinder and cuts a core 23 of diamond. The core 23 may be cut to very close tolerances and it may be cut in any direction in the body of the diamond. By this method it is possible to cut rods of diamond of much smaller diameter than those currently manufactured by conventional methods.

The apparatus shown in Figures 7 and 8 is suitable for producing a number of diamond rods simultaneously. One electrode 22 is a bundle of circular cylinders supported on a weight 23 which is connected by a parallel linkage to the support for the diamond so as to ensure that the bundle moves down in a straight line.

A circuit suitable for creating the sparking current is illustrated in Figure 9. The electrodes 14 and 22 are connected in series with a condenser 30 of between .0005 and .0022 microfarads, and in parallel with an adjustable spark gap 31. The gap varies between 3½ and ¼ mm. A resistance 32 of about 50 megohms is also connected in parallel with the spark gap and a limiting resistance 33 of between 0.5 and 5 megohms is in series with the spark gap and the electrodes. An alternating voltage from a suitable variable transformer or a direct current voltage from a rectifier is connected across the terminals 34. The voltage may vary between 1,000 and 15,000 volts.

A variation of this circuit may be used in which the electrodes are in series with the spark gap and in parallel with the condenser.

We claim:

1. A method of eroding a body of hard crystalline carbon, such as diamond, consisting in superficially graphitising at least part of the body, contacting the graphitised zone with two spaced electrodes submerged in an inert dielectric medium, impressing a spark-producing voltage between the electrodes and causing a force to act on at least one electrode in a direction relatively to the body calculated to effect the desired erosion of the body.

2. The method claimed in claim 1 in which the zone of graphitisation is a line.

3. The method claimed in claim 2 in which the zone is formed by contacting the surface of the body with two closely spaced electrodes under an inert dielectric medium and impressing a voltage between them.

4. The method claimed in claim 3 in which one electrode is moved to extend the zone.

5. The method claimed in claim 1 in which substantially the whole of the surface of the body is graphitised.

6. The method claimed in claim 5 in which the body is graphitised by heating it to white heat in an oxyacetylene flame, and slowly withdrawing the latter to cause the body to cool under the influence of the flame.

References Cited in the file of this patent

UNITED STATES PATENTS

| | | |
|---|---|---|
| 1,194,124 | Barrow | Aug. 8, 1916 |
| 1,333,311 | Holz et al. | Mar. 9, 1920 |
| 1,619,627 | Neiss | Mar. 1, 1927 |
| 2,306,054 | Guyer | Dec. 22, 1942 |
| 2,377,159 | Kurtz et al. | May 29, 1945 |
| 2,520,112 | Bourque et al. | Aug. 29, 1950 |
| 2,785,279 | Williams | Mar. 12, 1957 |
| 2,838,652 | Porterfield | June 10, 1958 |

FOREIGN PATENTS

| | | |
|---|---|---|
| 1,031,411 | France | Mar. 18, 1953 |